(12) United States Patent
Wang et al.

(10) Patent No.: US 9,894,411 B1
(45) Date of Patent: Feb. 13, 2018

(54) METHOD FOR CONFIGURING A TELEVISION AUDIO FORMAT, METHOD FOR TRANSPARENTLY TRANSMITTING AUDIO AND TELEVISION

(71) Applicants: HISENSE ELECTRIC CO., LTD., Qingdao (CN); HISENSE USA CORPORATION; HISENSE INTERNATIONAL CO., LTD., Qingdao (CN)

(72) Inventors: Zhikui Wang, Qingdao (CN); Lufeng Li, Qingdao (CN); Jingang Liu, Qingdao (CN); Chao Wu, Qingdao (CN)

(73) Assignees: Hisense Electric Co., Ltd., Shandong (CN); Hisense USA Corporation GA (US); Hisense International Co., Ltd., Shandong (CN)

(*) Notice: Subject to any disclaimer, the term of this patent is extended or adjusted under 35 U.S.C. 154(b) by 0 days.

(21) Appl. No.: 15/390,435

(22) Filed: Dec. 23, 2016

(30) Foreign Application Priority Data

Sep. 23, 2016 (CN) .......................... 2016 1 0848530

(51) Int. Cl.
| | |
|---|---|
| *H04N 21/442* | (2011.01) |
| *H04N 21/439* | (2011.01) |
| *H04N 21/45* | (2011.01) |
| *H04N 21/4363* | (2011.01) |
| *H04N 21/41* | (2011.01) |

(52) U.S. Cl.
CPC ..... *H04N 21/4398* (2013.01); *H04N 21/4104* (2013.01); *H04N 21/43635* (2013.01); *H04N 21/4516* (2013.01)

(58) Field of Classification Search
CPC ..................................................... H04N 21/442
USPC ................................................ 348/480–486
See application file for complete search history.

(56) References Cited

U.S. PATENT DOCUMENTS

| | | | |
|---|---|---|---|
| 7,558,326 B1* | 7/2009 | Lyle ..................... | H04L 1/0057 348/469 |
| 9,628,868 B2* | 4/2017 | LaBosco .............. | H04N 21/631 |
| 2008/0151113 A1* | 6/2008 | Park ..................... | H04N 21/235 348/500 |
| 2009/0083634 A1* | 3/2009 | Madonna ............... | G06F 3/023 715/733 |

(Continued)

*Primary Examiner* — Paulos M Natnael
(74) *Attorney, Agent, or Firm* — J.C. Patents (57) ABSTRACT

The present application provides a method for configuring a television audio format, a method for transparently transmitting audio and a television, where the method for configuring the television audio format includes: acquiring information regarding an audio format supported to be decoded by an external audio playing device; judging whether EDID information pre-stored in the television includes the information regarding the audio format supported to be decoded by the external audio playing device; if not, supplementing the EDID information with the information regarding the audio format supported to be decoded by the external audio playing device, where the supplemented EDID information is configured for a set top box connected to the television to determine whether to transparently transmit audio data or not based on the supplemented EDID information. The present application can avoid a loss in a tonal quality and improve a tonal quality effect of playing.

17 Claims, 4 Drawing Sheets

(56) References Cited

U.S. PATENT DOCUMENTS

| | | | |
|---|---|---|---|
| 2010/0141845 A1* | 6/2010 | Kikkawa | G09G 5/003 348/706 |
| 2010/0188566 A1* | 7/2010 | Oku | G09G 5/005 348/441 |
| 2010/0289871 A1* | 11/2010 | Tatsuta | H04N 13/0059 348/42 |
| 2010/0289872 A1* | 11/2010 | Funabiki | G09G 3/003 348/43 |
| 2011/0004911 A1* | 1/2011 | Kabuto | H04N 5/44 725/115 |
| 2012/0069894 A1* | 3/2012 | Sakimura | H04N 7/163 375/240.02 |

* cited by examiner

Shen et al.

METHOD FOR CONFIGURING A TELEVISION AUDIO FORMAT, METHOD FOR TRANSPARENTLY TRANSMITTING AUDIO AND TELEVISION

CROSS-REFERENCE TO RELATED APPLICATIONS

This application claims priority to Chinese Patent Application No. 201610848530.0, filed with the Chinese Patent Office on Sep. 23, 2016 and entitled "METHOD AND APPARATUS FOR TRANSPARENTLY TRANSMITTING AUDIO", which is hereby incorporated by reference in its entirety.

TECHNICAL FIELD

The present application relates to the field of application of radio and television and in particular relates to a method for configuring a television audio format, a method for transparently transmitting audio and an apparatus.

BACKGROUND

A digital video conversion box (set top box) is a device that connects a television to an external signal source. The set top box is usually equipped with a "transparent transmission" option. When the transparent transmission is selected to be enabled, audio data may be sent by the set top box to the television directly and decoded by the television, in this way, the audio data is decoded directly by the television, and a better tonal quality effect is achieved; when the transparent transmission is selected to be disabled, the set top box will decode the audio data acquired from an external signal source and then transmit it to the television; when an automatic transparent transmission is selected, the set top box may determine whether to decode the audio data by itself based on extended display identification data (Extended Display Identification Data, EDID) information read from the television, if the EDID information does not include an audio format to which the audio data to be transmitted belongs, the set top box will try to decode the audio data and then transmit it to the television, if the EDID information includes an audio format to which the audio data to be transmitted belongs, the set top box transparently transmits audio data to the television.

SUMMARY

In view of the above, the present application provides a method for configuring a television audio format, a method for transparently transmitting audio and a television.

A first aspect of the present application provides a method for configuring a television audio format, the method includes:

acquiring information regarding an audio format supported to be decoded by an external audio playing device;

judging whether EDID information pre-stored in the television includes the information regarding the audio format supported to be decoded by the external audio playing device;

if not, supplementing the EDID information with the information regarding the audio format supported to be decoded by the external audio playing device, where the supplemented EDID information is configured for a set top box connected to the television to determine whether to transparently transmit audio data or not based on the supplemented EDID information.

Another aspect of the present application provides a television, where the television includes: a storage, configured to store instructions; a processor coupled to the storage, and the processor is configured to execute the instructions stored in the storage, and the processor is configured to:

acquire information regarding an audio format supported to be decoded by an external audio playing device;

judging whether EDID information pre-stored in the television includes the information regarding the audio format supported to be decoded by the external audio playing device;

if the EDID information does not include the information regarding the audio format supported to be decoded by the external audio playing device, then supplement the EDID information with the information regarding the audio format supported to be decoded by the external audio playing device, where the supplemented EDID information is configured for the set top box connected to the television to determine whether to transparently transmit the audio data or not based on the supplemented EDID information.

Another aspect of the present application provides a method for transparently transmitting audio, applied in a television system, where the television system includes a television and a set top box connected to the television, and the method includes:

the television acquires information regarding an audio format supported to be decoded by an external audio playing device;

the television judges whether extended display identification data (EDID) information pre-stored in the television includes the information regarding the audio format supported to be decoded by the external audio playing device;

if the EDID information does not include the information regarding the audio format supported to be decoded by the external audio playing device, then the television supplements the EDID information with the information regarding the audio format supported to be decoded by the external audio playing device;

the set top box determines whether to transparently transmit audio data or not based on the supplemented EDID information.

DESCRIPTION OF EMBODIMENTS

Exemplary embodiments will be described hereinafter in detail. When the following description refers to the accompanying drawings, in which like numerals in different drawings refer to the like or similar parts unless otherwise indicated. The embodiments described in the following exemplary embodiments are not representative of all embodiments in conformity with the present application.

Instead, they are only examples of the method for configuring a television audio format, the method for transparently transmitting audio, and the television according to the present application.

The terminology used in this application is for the purpose of describing particular embodiments only and is not intended to limit the present application. Singular forms of "a", "the" and "this" are intended to include plural forms as well, unless other meanings are explicitly indicated in the context. Further, it should be understood that the term "and/or" as used herein refers to any or all possible combinations including one or more of the associated listed items.

It should be understood that, although various information may be described herein using the terms first, second, third, etc., these information should not be limited to these terms. These terms are only used to distinguish the same type of information from each other. For example, the first information may also be referred to as the second information, and similarly the second information may also be referred to as the first information, without departing from the scope of the present application. Depending on the context, for example, the word "if" as used herein may be construed to be "at the time when", "when" or "in response to the determination".

Figure 1:
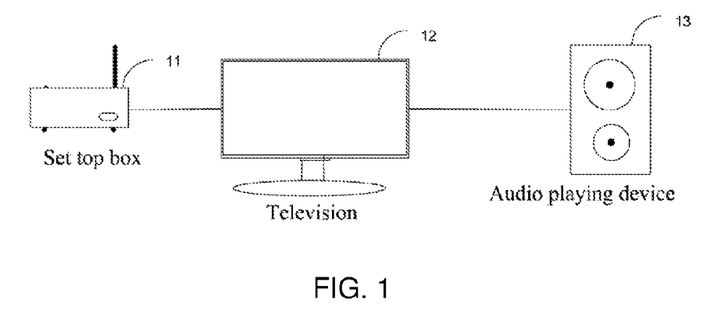
FIG. 1 is a schematic diagram of a television application scenario to which the present application is applied.

With the popularization of high-definition digital televisions, television-based application scenarios in the application are becoming more and more enriched. FIG. 1 is a schematic diagram of a television application scenario to which the present application is applied. As shown in FIG. 1, the television application scenario may include: a digital-video conversion box (set top box) 11, a television 12, and an audio playing device 13. The set top box 11 may be connected between an external signal source (not shown) and the television 12, and the television 12 may also be connected to the audio playing device 13.

The set top box 11 may transmit data acquired from an external signal source to the television 12. When the data is audio data and the automatic transparent transmission function of the set top box 11 is enabled, the set top box 11 can select whether or not to transparently transmit the audio data according to the audio format that is supported to be decoded by the television 12 and included in the EDID information acquired from the television 12. When the audio format to which the audio data to be transmitted belongs is included in the EDID information, the set top box 11 can transparently transmit the audio data, i.e., directly transmit the audio data to the television 12, and the audio data is decoded by the television 12. Wherein transparently transmitting the audio data indicates that the set top box outputs the audio date without decoding.

In the application scenario as illustrated in FIG. 1, assuming that the automatic transparent transmission function of the set top box 11 is enabled, and the EDID information of the television 12 includes an audio format A and an audio format B while the audio playing device 13 supports the decoding of audio data in the audio format C. Then, in related art, the set top box 11 can transparently transmit the audio data in the audio format A or in the audio format B, however, as to the audio data in the audio format C, the audio data in the audio format C is decoded by the set top box 11 as such, and then transmitted to the audio playing device 13 through the television 12. Thus, even if the audio playing device 13 as such supports the decoding of the audio data in the audio format C, it cannot decode the audio data in the audio format C by itself, but receives the decoded audio data. As the set top box is not a professional audio decoding device, and a simple soft decoding algorithm is usually employed in the set top box to convert the audio data from a digital signal into an analog signal, this process will inevitably lead to a loss of tonal quality. It should be understood that the A, B, and C in the aforementioned examples are not names of the audio formats in practical application, and merely serve as examples for convenience of description.

In order to solve the aforementioned problem, the present application provides a method for configuring a television audio format, a method for transparently transmitting audio, and a television applied to the above application scenario of FIG. 1. In the application scenario of FIG. 1, since the audio playing device 13 is an audio playing device located outside the television 12 and connected to the television 12, thus, the audio playing device 13 may be referred to as an external audio playing device of the television 12. And the external audio playing device related to the present application may be the audio playing device 13 shown in FIG. 1.

In the method for configuring a television audio format, the method for transparently transmitting audio and the method for television provided in the present application, the television 12 may acquire the audio format, e.g., audio format C, which is supported to be decoded by the audio playing device 13, and supplement, according to the audio format supported to be decoded by the audio playing device 13, the EDID information of the television 12, such that the EDID information of the television 12 includes not only the audio format supported to be decoded by the television 12, but also the audio format supported to be decoded by the audio playing device 13 to which the television 12 is connected. Thereby, the set top box 11 can perform, according to the supplemented EDID information, the transparent transmission of the audio data in the audio format C, the television 12 transmits the audio data to the audio playing device 13 in the case where the television 12 judges that the audio format C matches the audio format supported to be decoded by the audio playing device 13, such that the audio playing device 13 can decode and play the audio data in the audio format C, thus effectively avoiding a loss in a tonal quality and improving a tonal quality effect of playing.

Hereinafter, the method for configuring a television audio format according to the present application will be described in detail with reference to the following embodiments.

Figure 2:
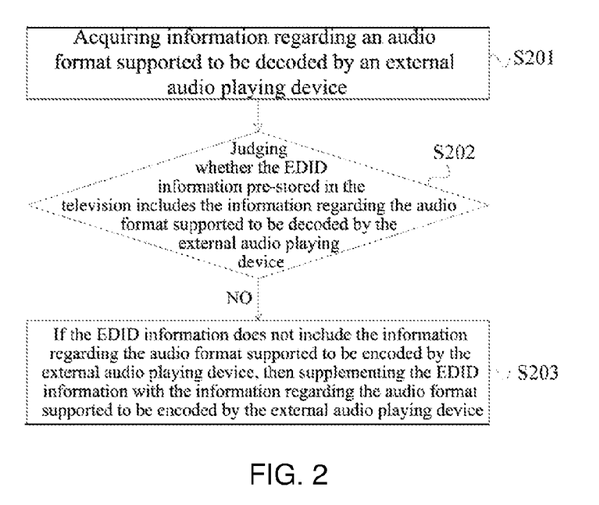
FIG. 2 is a flowchart of a method for configuring a television audio format according to the present application.

FIG. 2 is a flowchart of a method for configuring a television audio format according to the present application. The method for configuring the television audio format may be implemented through software and/or hardware by the television 12 in the application scenario described above with reference to FIG. 1. As illustrated in FIG. 2, the method for configuring the television audio format may include:

S201, acquiring information regarding an audio format supported to be decoded by an external audio playing device.

Exemplarily, the external audio playing device may be the audio playing device 13 connected to the television 12 in FIG. 1. Of course, the television 12 may be connected to at least one audio playing device, and FIG. 1 only shows one audio playing device as an example for the purpose of description. When the television 12 is connected to at least one audio playing device, the external audio playing device may be part or all of the audio playing devices in the at least one audio playing device.

In one implementation manner, the television 12 may, after being enabled, or after the television 12 detects a connection message for the audio playing device 13, acquire the information regarding the audio format supported to be decoded by the external audio playing device 13. The information regarding the audio format supported to be decoded by audio playing device 13 may include the audio format supported to be decoded by the audio playing device 13, such as the audio format C.

In an optional implementation manner, where the acquiring the information regarding the audio format supported to be decoded by the external audio playing device in S201 as described above includes:

after detecting the connection message of the external audio playing device; generating an audio format acquisition instruction according to a consumer electronics control/audio return channel (Consumer Electronics Control/Audio Return Channel, CEC/ARC) protocol;

the information regarding the audio format supported to be decoded by the external audio playing device is acquired through the audio format acquisition instruction.

After acquiring the information regarding the audio format supported to be decoded by the external audio playing device 13, the television 12 may maintain EDID information of the television 12 according to the acquired information regarding the audio format supported to be decoded by the external audio playing device 13, for example, the EDID information of the television 12 may be supplemented with the information regarding the audio format supported to be decoded by the external audio playing device, such that the EDID information of the television 12 may include the audio format supported to be decoded by the audio playing device 13.

In addition, it will be understood that the aforementioned timing for the television 12 to acquire the information regarding the audio format supported to be decoded by the audio playing device 13 only serves as an example. In practice, there may also be other possibilities, which are not limited in this application. For example, in one possible implementation manner, the television 12 may acquire the information regarding the audio format from the audio playing device 13 at every preset time interval, such that the television 12 can acquire the latest audio format supported to be decoded by the audio playing device 13. In another possible implementation manner, the audio playing device 13 periodically reports the information regarding the audio format supported to be decoded by itself after the television 12 is enabled.

S202, judging whether the EDID information pre-stored in the television includes the information regarding the audio format supported to be decoded by the external audio playing device.

Exemplarily, the EDID information in the television may be the EDID information of the television 12. The EDID information of the television 12 may store the information regarding the audio format supported to be decoded by the television 12.

In one implementation manner, before the judging whether the EDID information pre-stored in the television includes the information regarding the audio format supported to be decoded by the audio playing device in step S202, the method may further include:

the EDID information is acquired from interface information of the television, and the interface is configured to connect the television to the set top box. That is, the interface may be an interface at the television 12 side, and the interface at the television 12 side is connected to the interface at the set top box 11 side, thus implementing a connection between the television 12 and the set top box 11.

In one example, the interface of the television 12 may be a high definition multimedia interface (High Definition Multimedia Interface, HDMI) of the television 12, that is, an HDMI interface at the television 12 side may be connected to the HDMI interface at the set top box 11 side, thus implementing the connection between the television 12 and the set top box 11. And the interface information of the television here may be information corresponding to the HDMI interface of the television 12. Based on the HDMI interface, the present application may further provide an implementation manner for acquiring the EDID information of the television, as shown in another implementation manner described below.

In another implementation manner, before the judging whether the EDID information pre-stored in the television includes the information regarding the audio format supported to be decoded by the audio playing device in step S202, the method may further include:

acquiring the EDID information of the television from the information corresponding to the HDMI interface of the television; the HDMI interface is configured to connect to a set top box, and the EDID information may include: information regarding audio format currently supported to be decoded by the television, such as audio format A and audio format B.

In one application example, the television may include at least one HDMI interface for connection to external devices such as set top boxes, audio playing devices, and the like. In this application, the HDMI interface of the television refers to the HDMI interface configured to connect the set top box among the HDMI interfaces of the television.

For each HDMI interface, the information corresponding to each of the HDMI interfaces is usually stored in the television, and the information corresponding to each HDMI interface may include the EDID information corresponding to each HDMI interface. The EDID information corresponding to each HDMI interface may be stored in a storage corresponding to programs, for an initialization during system startup. Each HDMI interface in the television may have a corresponding storage, which may be an electrically erasable programmable read-only memory (Electrically Erasable Programmable Read-Only Memory, EEPROM), where the EDID information corresponding to each HDMI interface is stored. Thus, in the method provided by the present application, it is possible to acquire the information corresponding to the HDMI interface from the storage corresponding to the HDMI interface of the television. External devices such as the set top box, the external audio playing device, in the hot-plug process of HDMI interfaces, could access the storage corresponding to each HDMI interface through a direct digital control (Direct Digital Control, DDC) channel of each HDMI interface, so as to acquire EDID data corresponding to each HDMI interface from the storage corresponding to each HDMI interface. As for the HDMI interface, which is in the television and connected to the set top box, the EDID information may be acquired in the manner similar to that described above, the details are not described herein again. The EDID information may include parameter information supported by the television, for example, an image resolution, the audio format supported to be decoded, a sound channel, 3D and the like.

Thus, after the EDID information is acquired, the information regarding the audio format currently supported to be decoded by the television, which is included in the EDID information, can be acquired.

S203, if the EDID information does not include the information regarding the audio format supported to be encoded by the external audio playing device, then supplementing the EDID information with the information regarding the audio format supported to be encoded by the external audio playing device.

If the EDID information includes the information regarding the audio format supported to be encoded by the external audio playing device, then no processing is performed for the EDID information.

Where the supplemented EDID information is configured for the set top box connected to the television to determine whether to transparently transmit the audio data or not based on the supplemented EDID information.

In one example, the method may supplement all the audio formats included in the information regarding the audio format supported to be encoded by the external audio playing device into the EDID information; in another example, part of the audio formats included in the information regarding the audio format supported to be encoded by the external audio playing device may be supplemented into the EDID information, for example, supplementing the audio format which is different from the audio format currently supported to be decoded by the television into the EDID information.

The supplemented EDID information may include not only information regarding the audio format currently supported to be decoded by the television, but the information regarding the audio format supported to be decoded by the external audio playing device. Thus, even if the television does not support to decode the audio format of the audio data, the set top box can still transparently transmit the audio data whose audio format is supported to be decoded by the external audio playing device.

In the application scenario illustrated in FIG. 1, the set top box 11 may transparently transmit the audio data according to the supplemented EDID information when the automatic transparent transmission function of the set top box 11 is enabled. For example, as the supplemented EDID information includes the audio format C, when the set top box 11 transmits the audio data in the audio format C, it may transparently transmit the audio data, thus enabling the audio playing device 13 to receive the audio data that has not been decoded, and the audio playing device 13 as such may decode the audio data to avoid a loss in the tonal quality.

The method for configuring a television audio format according to the present application can provide: acquiring the information regarding the audio format supported to be decoded by the external audio playing device, judging whether the EDID information pre-stored in the television includes the information regarding the audio format supported to be decoded by the external audio playing device, and if not, supplementing the EDID information with the information regarding the audio format supported to be decoded by the external audio playing device, such that the set top box connected to the television can acquire all the audio formats supported to be decoded by the television and by the external audio playing device according to the supplemented EDID information, and then determine whether to transparently transmit the audio data or not. Thus, even if the television does not support to decode the audio format of the audio data, the set top box can transparently transmit the audio data of the audio format supported to be decoded by the external audio playing device, thus realizing the decoding of the audio data by the external audio playing device as such, and avoiding a loss in the tonal quality caused by the decoding of the audio data by the set top box, and improving the tonal quality effect of playing.

In yet another example, the present application also provides a method for configuring a television audio format.

Figure 3:
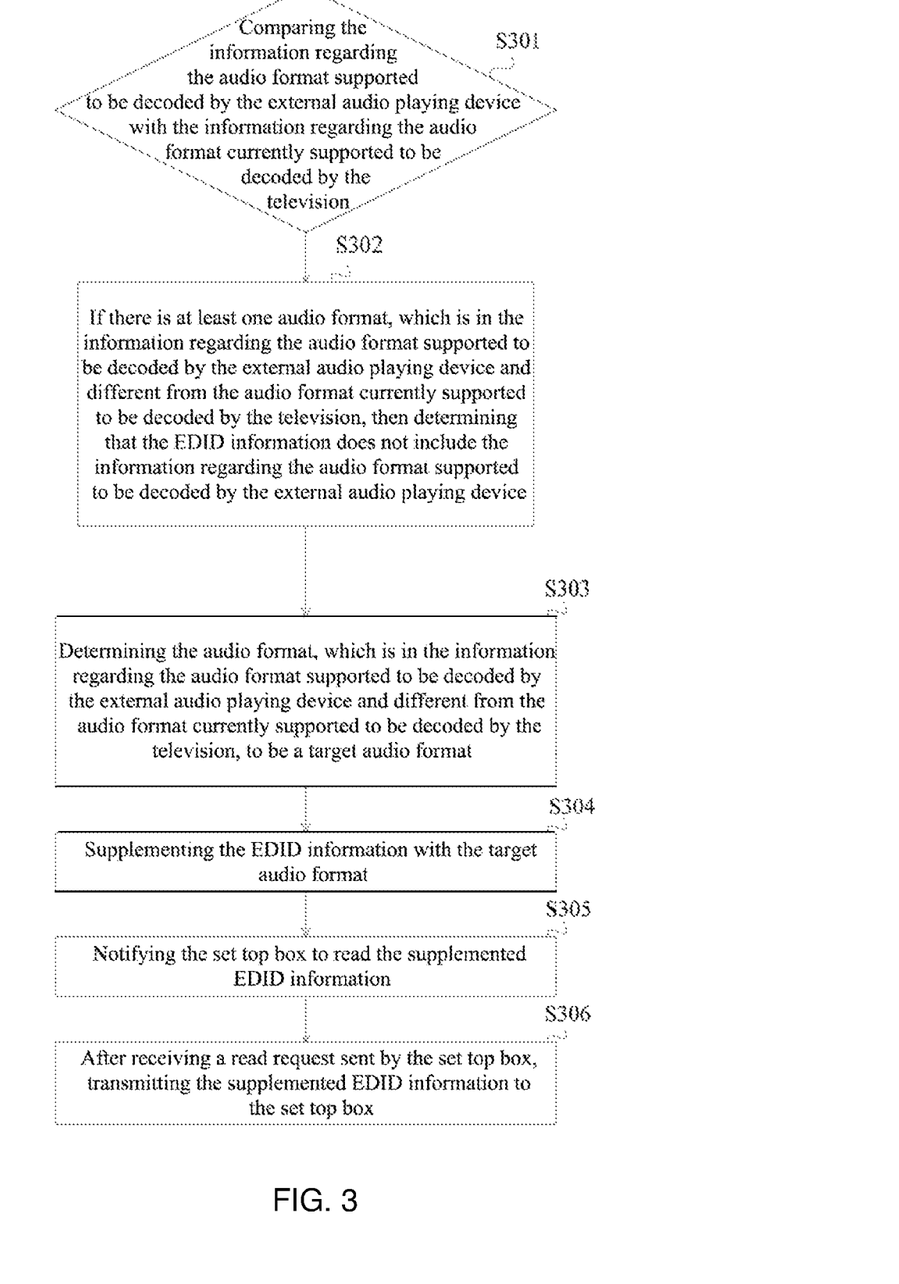
FIG. 3 is a flowchart of another method for configuring a television audio format according to the present application.

FIG. 3 is a flowchart of another method for configuring a television audio format according to the present application. As shown in FIG. 3, on the basis of the aforementioned method shown in FIG. 2, where the judging whether the EDID information pre-stored in the television includes the information regarding the audio format supported to be decoded by the audio playing device as described in S202 may include:

S301, comparing the information regarding the audio format supported to be decoded by the external audio playing device with the information regarding the audio format currently supported to be decoded by the television.

S302, if there is at least one audio format, which is in the information regarding the audio format supported to be decoded by the external audio playing device and different from the audio format currently supported to be decoded by the television, then determining that the EDID information does not include the information regarding the audio format supported to be decoded by the external audio playing device.

Exemplarily, the method may be to compare each audio format, which is included in the information regarding the audio format supported to be decoded by the external audio playing device, to each audio format included in the information regarding the audio format currently supported to be decoded by the television.

When the audio format included in the information regarding the audio format currently supported to be decoded by the television includes each audio format included in the information regarding the audio format supported to be decoded by the external audio playing device, then it can be determined that the EDID information includes all the audio formats which are included in the information regarding the audio format supported to be decoded by the external audio playing device.

If there exists at least one audio format, in the audio formats included in the information regarding the audio format supported to be decoded by the external audio playing device, that is different from the audio format included in the information regarding the audio format currently supported to be decoded by the television, then it can be determined that the EDID information does not include all the audio formats which are included in the information regarding the audio format supported to be decoded by the external audio playing device. Thus the information regarding the audio format supported to be decoded by the external audio playing device has information different from the information regarding the audio format currently supported to be decoded by the television.

In an optional implementation manner, where the supplementing the EDID information with the information regarding the audio format supported to be encoded by the external audio playing device as described above in S201 may include:

S303, determining the audio format, which is in the information regarding the audio format supported to be decoded by the external audio playing device and different from the audio format currently supported to be decoded by the television, to be a target audio format.

If the information regarding the audio format supported to be decoded by the external audio playing device has information different from the information regarding the audio format currently supported to be decoded by the television, in the method, it is possible to determine, according to the different information, the audio format which is in the information regarding the audio format supported to be decoded by the external audio playing device and different from the audio format currently supported to be decoded by the television, and then determining the different audio format as the target audio format.

S304, supplementing the EDID information with the target audio format.

In the application scenario illustrated in FIG. 1, after the execution of S303, since the audio format supported to be decoded by the audio playing device 13, e.g., the audio format C is different from the audio formats, e.g., A and B, which are supported to be decoded by the television 12, the audio playing device 13 can supplement the EDID information of the television 12 with the audio format C, thus realizing the supplement to the EDID information of the television 12, such that the supplemented EDID information includes not only the audio format supported to be decoded by the television 12 but also the audio format supported to be decoded by the audio playing device 13. For example, the supplemented EDID information includes the audio format A, the audio format B, and the audio format C.

In the method for configuring the television audio format, determining the audio format, which is in the information regarding the audio format supported to be decoded by the external audio playing device and different from the audio format currently supported to be decoded by the television, to be the target audio format, then supplementing the EDID information, thereby reducing an amount of data supplemented to the EDID information and improving a supplement efficiency of the EDID information.

In another optional implementation manner, after supplementing the EDID information with the information regarding the audio format supported to be encoded by the external audio playing device as described above in S201, the method may further include:

S305, notifying the set top box to read the supplemented EDID information.

After the television 12 supplements the EDID information with the information regarding the audio format supported to be encoded by the audio playback device 13, the television 12 can then detect that the EDID information of the television 12 is updated and then informs the set top box 11 to read the supplemented EDID information.

S306, after receiving a read request sent by the set top box, transmitting the supplemented EDID information to the set top box.

After receiving the notification from the television 12, the set top box 11 can transmit the read request to the television 12, and after acquiring the supplemented EDID information, the set top box 11, according to the information regarding the audio format included in the supplemented EDID information, transparently transmits the audio data. The supplemented EDID information received by the set top box 11 includes the audio format supported to be decoded by the audio playing device 13, for example, the audio format C. Thus, in the case where the automatic transmission function of the set top box 11 is enabled, when the audio data in the audio format C is transmitted, the audio data can be transmitted transparently according to the supplemented EDID information. The audio data received by the audio playing device 13 may be the audio data that has not been decoded, thus the audio playing device 13 as such may decode the audio data, thereby avoiding a loss in the tonal quality.

In another optional implementation, where the notifying the set top box to read the supplemented EDID information as shown above in S305 may include:

after supplementing the EDID information with the information regarding the audio format supported to be decoded by the external audio playing device, triggering a modification instruction for a Hot-Plug Detect pin of the HDMI interface of the television;

in accordance with the modification instruction, controlling a level change of the Hot-Plug Detect pin in the HDMI interface of the television, where the level change is configured to notify the set top box that the EDID information in the television has been updated.

For example, the television 12 may make the level of the Hot-Plug Detect pin in the HDMI interface of the television 12 to firstly decrease and then rise. The set top box 11 determines that the EDID information in the television 12 has been updated, upon detecting the level change of the Hot-Plug Detect pin in the HDMI interface of the television 12, which is to firstly decrease and then rise. It may be understood that the change of firstly decreasing and then rising is only one example of the level change, and the level change may also be in other forms, which are not repeated herein.

In yet another optional implementation manner, where the controlling the level change of the Hot-Plug Detect pin in the HDMI interface of the television according to the modification instruction as described above may include:

according to the modification instruction, controlling the level of the Hot-Plug Detect pin to change over a preset period of time continuously.

Notifying, by means of the continuous level change of the Hot-Plug Detect pin over the preset period of time, the set top box that the EDID information in the television has been updated, thus enabling the set top box to detect the level change of the Hot-Plug Detect pin accurately and timely, and thereby to know in time that the EDID information in the television has been updated. Where the continuous change may be from a high level to a low level and then to a high level again, or from a low level to a high level and then to a low level again.

In yet another optional implementation, the method may further include:

judging whether the audio format of the audio data to be transparently transmitted matches the audio format supported to be decoded by the external audio playing device after receiving from the set top box the source audio data to be transparently transmitted;

if so, transmitting the audio data to be transparently transmitted to the external audio playing device so that the external audio playing device decodes and plays the audio data to be transmitted transparently.

For example, if the audio format of the audio data, which is received from the set top box and to be transparently transmitted, is the audio format C, and the audio playing device 13 can support to decode the audio format C, then the television 12 may transmit the audio data to be transparently transmitted to the audio playing device 13, and the audio data information to be transparently transmitted is decoded and played by the audio playing device 13, thus the audio playing device 13 receives the audio data which has not been decoded by the set top box 11 or by the television 12, and in accordance with a processing capability of the decoding chip configured by itself, the audio playing device 13 can perform a decoding process on the audio data to be transmitted transparently and restore the playback to the greatest extent from content sampling to storing, editing, playback and other processes for the audio data, thereby achieving a better acoustic playing effect and effectively guarantying the tonal quality effect of playing.

In addition, if the television 12 also supports to decode the audio format C, and the television 12 is connected to the audio playing device 13, it is preferable that the audio playing device 13 as such processes the audio data so as to achieve a better tonal quality, thus achieving the best restoration of the tonal quality, and avoiding a loss in the tonal quality caused by the processing of other devices, thereby effectively guarantying the tonal quality effect of playing.

The present application may also provide a method for transparently transmitting audio based on the aforementioned method for configuring the television audio format. The method for transparently transmitting the audio may be applied in a television system, which may include: a television and a set top box connected to the television. The television may be the television 12 in the application scenario shown above in FIG. 1, and the set top box may be the set top box 11 in the application scenario shown above in FIG. 1.

Figure 4:
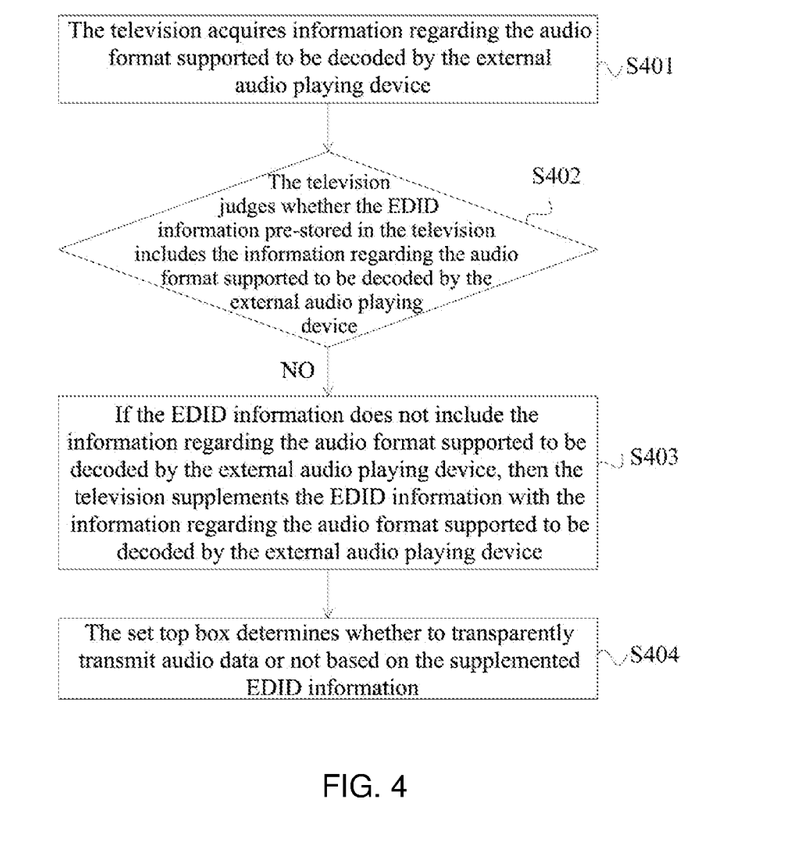
FIG. 4 is a flowchart of a method for transparently transmitting audio according to the present application.

FIG. 4 is a flowchart of a method for transparently transmitting audio according to the present application. As shown in FIG. 4, the method for transparently transmitting the audio may include:

S401, the television acquires information regarding the audio format supported to be decoded by the external audio playing device.

The aforementioned S201 can be referred to for the implementation of S401, and the details are not repeated herein again.

S402, the television judges whether the EDID information pre-stored in the television includes the information regarding the audio format supported to be decoded by the external audio playing device.

The aforementioned S202 can be referred to for the implementation of S402, and the details are not repeated herein again.

S403, if the EDID information does not include the information regarding the audio format supported to be decoded by the external audio playing device, then the television supplements the EDID information with the information regarding the audio format supported to be decoded by the external audio playing device.

The aforementioned S203 can be referred to for the implementation of S403, and the details are not repeated herein again.

S404, the set top box determines whether to transparently transmit audio data or not based on the supplemented EDID information.

In one implementation manner, in S404 as described above, before the set top box determines whether to transparently transmit the audio data or not based on the supplemented EDID information, the method may further include:

the television transmits a notification message to the set top box notifying the set top box to read the supplemented EDID information;

after receiving the notification message, the set top box transmits a read request to the television;

after receiving the read request, the television transmits the supplemented EDID information to the set top box.

In another implementation manner, the notification message is a level change of a Hot-Plug Detect pin in a HDMI interface of the television, where the HDMI interface is configured to connect the television to the set top box.

Where the television as described above transmits the notification message to the set top box may include:

after supplementing the EDID information with the information regarding the audio format supported to be decoded by the external audio playing device, the television triggers a modification instruction for a Hot-Plug Detect pin of the HDMI interface of the television;

the television controls the level change of the Hot-Plug Detect pin in the HDMI interface according to the modification instruction.

In yet another optional implementation manner, where the television as described above controls the level change of the Hot-Plug Detect pin in the HDMI interface according to the modification instruction may include:

the television controls, according to the modification instruction, the level of the Hot-Plug Detect pin to change over a preset period of time continuously.

In yet another optional implementation manner, where the television as described above acquires the information regarding the audio format supported to be decoded by the external audio playing device may include:

after detecting a connection message of the external audio playing device, the television generates an audio format acquisition instruction according to a CEC/ARC protocol;

the television acquires the information regarding the audio format supported to be decoded by the external audio playing device through the audio format acquisition instruction.

In yet another implementation manner, in S404, after the set top box determines whether to transparently transmit the audio data or not based on the supplemented EDID information, the method may further include:

the set top box transmits the audio data to the television if determining that the audio data needs to be transparently transmitted;

the television judges whether the audio format of the audio data to be transparently transmitted matches the audio format supported to be decoded by the external audio playing device after receiving from the set top box the audio data to be transparently transmitted;

if so, the television transmits the audio data to the external audio playing device so that the external audio playing device decodes and plays the audio data.

The method for transparently transmitting the audio according to the present application can provide: acquiring the information regarding the audio format supported to be decoded by the external audio playing device, judging whether the EDID information pre-stored in the television includes the information regarding the audio format supported to be decoded by the external audio playing device, and if not, supplementing the EDID information with the information regarding the audio format supported to be decoded by the external audio playing device, such that the set top box connected to the television can acquire all the audio formats supported to be decoded by the television and by the external audio playing device according to the supplemented EDID information, and then determine whether to transparently transmit the audio data or not. Thus, even if the television does not support to decode the audio format of the audio data, the set top box can transparently transmit the audio data of the audio format supported to be decoded by the external audio playing device, thus realizing the decoding of the audio data by the external audio playing device as such, and avoiding a loss in the tonal quality caused by the decoding of the audio data by the set top box, and improving the tonal quality effect of playing.

Figure 5:
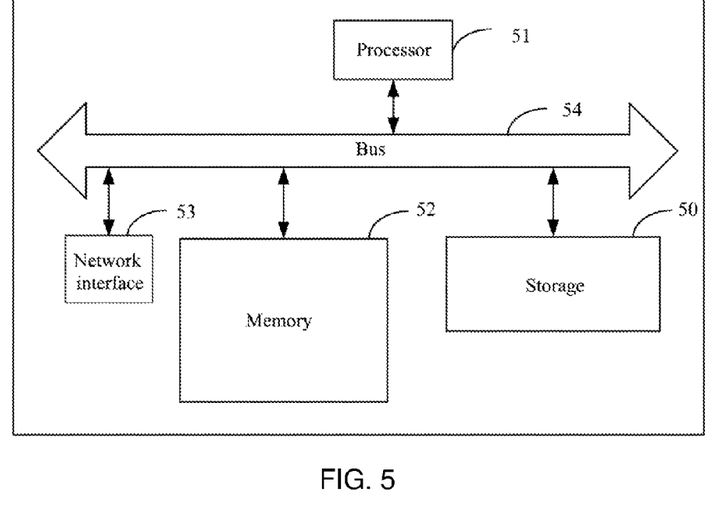
FIG. 5 is a schematic structural diagram of a television according to the present application.

The present application also provides a television. FIG. 5 is a schematic structural diagram of a television according to the present application. As shown in FIG. 5, the television includes: a storage 50 and a processor 51.

The storage 50 is configured to store instructions; the processor 51 is coupled to the storage 50, which is configured to execute the instructions stored in the storage 50, and the processor 51 is configured to:

acquire information regarding the audio format supported to be decoded by the external audio playing device;

judge whether the EDID information pre-stored in the television includes the information regarding the audio format supported to be decoded by the external audio playing device;

if the EDID information does not include the information regarding the audio format supported to be decoded by the external audio playing device, then supplement the EDID information with the information regarding the audio format supported to be decoded by the external audio playing device, where the supplemented EDID information is configured for the set top box connected to the television to determine whether to transparently transmit the audio data or not based on the supplemented EDID information.

In one implementation manner, the processor 51 is further configured to:

acquire the EDID information from information corresponding to a HDMI interface of the television; where the HDMI interface is configured to connect to the set top box; where the EDID information includes: information regarding the audio format currently supported to be decoded by the television.

In another implementation manner, the processor 51 is configured to:

compare the information regarding the audio format supported to be decoded by the external audio playing device with the information regarding the audio format currently supported to be decoded by the television;

if the information regarding the audio format supported to be decoded by the external audio playing device has information different from the information regarding the audio format currently supported to be decoded by the television, then determine that the EDID information does not include the information regarding the audio format supported to be decoded by the external audio playing device.

In yet another implementation manner, the processor 51 is configured to:

determine the audio format, which is in the information regarding the audio format supported to be decoded by the external audio playing device and different from the audio format currently supported to be decoded by the television, to be the target audio format, and supplement the EDID information with the target audio format.

In yet another implementation manner, the television may further include: a memory 52, a network interface 53, a bus 54, and other hardware. The storage 50, the processor 51, the memory 52, and the network interface 53 are connected to the bus 54, respectively.

In the television provided by the present application, the processor may be configured to acquire the information regarding the audio format supported to be decoded by the external audio playing device, and judge whether the EDID information pre-stored in the television includes the information regarding the audio format supported to be decoded by the external audio playing device, if not, supplement the EDID information with the information regarding the audio format supported to be decoded by the external audio playing device, such that the set top box connected to the television can acquire all the audio formats supported to be decoded by the television and by the external audio playing device according to the supplemented EDID information, and then determine whether to transparently transmit the audio data or not. Thus, even if the television does not support to decode the audio format of the audio data, the set top box can transparently transmit the audio data of the audio format supported to be decoded by the external audio playing device, thus realizing the decoding of the audio data by the external audio playing device as such, and avoiding a loss in the tonal quality caused by the decoding of the audio data by the set top box, and improving the tonal quality effect of playing.

The foregoing is only intended to be a preferred embodiment of the present application and is not intended to limit the present application, and any modifications, equivalent alternatives, improvements, etc., which fall within the spirit and principles of the present application, are intended to be encompassed within the scope of the present application.

What is claimed is:

1. A method for configuring a television audio format, wherein the method comprises:

acquiring, by a television, information regarding an audio format supported to be decoded by an external audio playing device;

comparing the information regarding the audio format supported to be decoded by the external audio playing device with extended display identification data (EDID) information pre-stored in the television, wherein the EDID information comprises: information regarding the audio format currently supported to be decoded by the television;

when there is at least one audio format, which is in the information regarding the audio format supported to be decoded by the external audio playing device and different from the audio format currently supported to be decoded by the television, supplementing, by the television, the EDID information according to the information regarding the audio format supported to be decoded by the external audio playing device, wherein the supplemented EDID information is configured for a set top box connected to the television to determine whether to transmit undecoded audio data to the television or not based on the supplemented EDID information.

2. The method according to claim 1, wherein before the when the EDID information pre-stored in the television does not comprise the information regarding the audio format supported to be decoded by the external audio playing device, supplementing, by the television, the EDID information with the information regarding the audio format supported to be decoded by the external audio playing device, the method further comprises:

acquiring the EDID information from information corresponding to a high definition multimedia interface (HDMI) interface of the television; wherein the HDMI interface is configured to connect the set top box.

3. The method according to claim 1, wherein the supplementing, by the television, the EDID information with the information regarding the audio format supported to be decoded by the external audio playing device, comprising:

determining, by the television, the audio format, which is in the information regarding the audio format supported to be decoded by the external audio playing device and different from the audio format currently supported to be decoded by the television, to be a target audio format;

supplementing, by the television, the EDID information with the target audio format.

4. The method according to claim 1, wherein after the supplementing, by the television, the EDID information with the information regarding the audio format supported to be decoded by the external audio playing device, the method further comprises:

notifying, by the television, the set top box to read the supplemented EDID information;

after receiving a read request sent by the set top box, transmitting, by the television, the supplemented EDID information to the set top box.

5. The method according to claim 4, wherein the notifying, by the television, the set top box to read the supplemented EDID information comprises:

after supplementing the EDID information with the information regarding the audio format supported to be decoded by the external audio playing device, triggering, by the television, a modification instruction for a Hot-Plug Detect pin of a HDMI interface of the television;

in accordance with the modification instruction, controlling, by the television, a level change of the Hot-Plug Detect pin in the HDMI interface of the television, wherein the level change is configured to notify the set top box that the EDID information in the television has been updated; wherein the HDMI interface is configured to connect the television to the set top box.

6. The method according to claim 5, wherein the controlling, by the television, the level change of the Hot-Plug Detect pin in the HDMI interface of the television in accordance with the modification instruction comprising:

according to the modification instruction, controlling, by the television, the level of the Hot-Plug Detect pin to change over a preset period of time continuously.

7. The method according to claim 1, wherein the acquiring, by the television, the information regarding the audio format supported to be decoded by the external audio playing device, comprising:

after detecting a connecting message of the external audio playing device, generating, by the television, an audio format acquisition instruction according to a consumer electronics control/audio return channel (CEC/ARC) protocol;

acquiring, by the television, the information regarding the audio format supported to be decoded by the external audio playing device through the audio format acquisition instruction.

8. The method according to claim 1, wherein the method further comprises:

judging, by the television, whether the audio format of the undecoded audio data to be transmitted matches the audio format supported to be decoded by the external audio playing device after receiving from the set top box the undecoded audio data to be transmitted;

if so, transmitting, by the television, the undecoded audio data to be transmitted to the external audio playing device so that the external audio playing device decodes and plays the undecoded audio data to be transmitted.

9. A television, wherein the television comprises: a storage and a processor;

the storage is configured to store instructions;

the processor is coupled to the storage and configured to execute the instructions stored in the storage, and the processor is configured to:

acquire information regarding an audio format supported to be decoded by an external audio playing device;

compare the information regarding the audio format supported to be decoded by the external audio playing device with extended display identification data (EDID) information pre-stored in the television, wherein the EDID information comprises: information regarding the audio format currently supported to be decoded by the television;

when there is at least one audio format, which is in the information regarding the audio format supported to be decoded by the external audio playing device and different from the audio format currently supported to be decoded by the television, supplement the EDID information according to the information regarding the audio format supported to be decoded by the external audio playing device, wherein the supplemented EDID information is configured for the set top box connected to the television to determine whether to transmit undecoded audio data to the television or not based on the supplemented EDID information.

10. The television according to claim 9, wherein the processor is further configured to:

acquire the EDID information from information corresponding to a high definition multimedia interface (HDMI) interface of the television; wherein the HDMI interface is configured to connect the set top box.

11. The television according to claim 9, wherein the processor is configured to:

determine the audio format, which is in the information regarding the audio format supported to be decoded by the external audio playing device and different from the audio format currently supported to be decoded by the television, to be the target audio format; and supplement the EDID information with the target audio format.

12. A method for transparently transmitting audio, applied in a television system, wherein the television system comprises a television and a set top box connected to the television, and the method comprises:

the television acquires information regarding an audio format supported to be decoded by an external audio playing device;

the television compares the information regarding the audio format supported to be decoded by the external audio playing device with extended display identification data (EDID) information pre-stored in the television, wherein the EDID information comprises: information regarding the audio format currently supported to be decoded by the television;

when there is at least one audio format, which is in the information regarding the audio format supported to be decoded by the external audio playing device and different from the audio format currently supported to be decoded by the television, the television supplements the EDID information according to the information regarding the audio format supported to be decoded by the external audio playing device;

the set top box determines whether to transmit undecoded audio data to the television based on the supplemented EDID information.

13. The method according to claim 12, wherein before the set top box determines whether to transmit the undecoded audio data to the television based on the supplemented EDID information, the method further comprises:

the television transmits a notification message to the set top box notifying the set top box to read the supplemented EDID information;

after receiving the notification message, the set top box transmits a read request to the television;

after receiving the read request, the television transmits the supplemented EDID information to the set top box.

14. The method according to claim 13, wherein the notification message is a level change of a Hot-Plug Detect pin in a high definition multimedia interface (HDMI) interface of the television, and the HDMI interface is configured to connect the television to the set top box;

wherein the television transmits a notification message to the set top box comprises:

after supplementing the EDID information with the information regarding the audio format supported to be decoded by the external audio playing device, the television triggers a modification instruction for a Hot-Plug Detect pin of a HDMI interface of the television;

the television controls the level change of the Hot-Plug Detect pin in the HDMI interface according to the modification instruction.

15. The method according to claim 14, wherein the television controls the level change of the Hot-Plug Detect pin in the HDMI interface according to the modification instruction comprises:

the television controls, according to the modification instruction, the level of the Hot-Plug Detect pin to change over a preset period of time continuously.

16. The method according to claim 12, wherein the television acquires the information regarding the audio format supported to be decoded by the external audio playing device, comprises:

after detecting a connection message of the external audio playing device, the television generates an audio format acquisition instruction according to a consumer electronics control/audio return channel (CEC/ARC) protocol;

acquiring the information regarding the audio format supported to be decoded by the external audio playing device through the audio format acquisition instruction.

17. The method according to claim 12, after the set top box determines whether to transmit the undecoded audio data to the television based on the supplemented EDID information, the method further comprises:

the set top box transmits the undecoded audio data to the television if determining that the undecoded audio data needs to be transmitted to the television;

the television judges whether the audio format of the undecoded audio data to be transmitted matches the audio format supported to be decoded by the external audio playing device after receiving from the set top box the undecoded audio data to be transmitted;

if so, the television transmits the undecoded audio data to the external audio playing device so that the external audio playing device decodes and plays the undecoded audio data.

* * * * *